United States Patent [19]
Halford

[11] Patent Number: 5,419,584
[45] Date of Patent: May 30, 1995

[54] AIR BAG RETENTION CLIP

[75] Inventor: Rick L. Halford, Midvale, Utah

[73] Assignee: Morton International, Inc., Chicago, Ill.

[21] Appl. No.: 236,613

[22] Filed: May 2, 1994

[51] Int. Cl.⁶ ............................................. B60R 21/20
[52] U.S. Cl. .................... 280/728.2; 248/99; 220/404
[58] Field of Search ............... 280/728 A, 732, 743 R, 280/728 R, 731, 730 R; 248/99, 100, 101; 220/404; 383/3; 141/313, 314

[56] References Cited

U.S. PATENT DOCUMENTS

| | | | |
|---|---|---|---|
| 597,511 | 1/1898 | Powell. | |
| 3,797,853 | 3/1974 | Grosch et al. . | |
| 3,944,250 | 3/1976 | Wulf et al. | 280/732 |
| 4,111,457 | 9/1978 | Kob et al. | 280/728 A |
| 4,988,119 | 1/1991 | Hartmeyer | 280/728 A |
| 5,064,218 | 11/1991 | Hartmeyer | 280/728 A |
| 5,074,584 | 12/1991 | Jarboe | 280/728 A |
| 5,094,476 | 3/1992 | Chihaya | 280/743 R |
| 5,096,222 | 3/1992 | Komerska et al. | 280/732 |
| 5,135,253 | 8/1992 | Hirashima et al. | 280/732 |
| 5,209,511 | 5/1993 | Morita | 280/728 A |
| 5,209,519 | 5/1993 | Shiga et al. | 280/728 A |
| 5,308,109 | 5/1994 | Igawa | 280/728 A |
| 5,322,324 | 6/1994 | Hansen et al. | 280/732 |
| 5,326,131 | 7/1994 | Yokota et al. | 280/743 R |
| 5,332,256 | 7/1994 | Lauritzen et al. | 280/728 A |

Primary Examiner—Margaret A. Focarino
Assistant Examiner—Peter C. English
Attorney, Agent, or Firm—Mark F. LaMarre; Nick C. Kottis; Gerald K. White

[57] ABSTRACT

An air bag cushion retention clip that, when used in conjunction with a two-part canister, distributes the deployment forces over the length of the clip. Further, the retention clip reduces the possibility that the sharp edges on the canister will cut through the air bag cushion during deployment thereof.

3 Claims, 2 Drawing Sheets

AIR BAG RETENTION CLIP

BACKGROUND OF THE INVENTION

1. Field of the Invention

The present invention relates to an automotive safety device which, upon the onset of a collision, deploys an inflatable restraint cushion, commonly known as an air bag, so as to provide impact protection to occupants of the passenger vehicles. More particularly, this invention relates to an improved device for securing an air bag cushion to a canister.

2. Description of Related Art

An air bag restraint system typically includes a canister, which has an open side and which canister encloses an inflator and at least part of an air bag, and a cover which conceals the module from view. A driver side air bag module is typically mounted in the center of the steering wheel behind a protective cover. When the air bag module is designed for the passenger side of a vehicle, the container may be located just behind the vehicle dashboard, cosmetic cover, or passenger-side instrument panel (hereinafter referred to as "dashboard") and the cover may form an integral part of the vehicle dashboard.

When the vehicle is involved in a collision, a crash signal initiates operation of the inflator to cause the air bag to deploy. The inflator provides an inert gas (e.g., nitrogen) which is directed under pressure into the air bag to force the air bag out of the canister incorporated in the module and into the passenger compartment of the vehicle. As the air bag is forced out of the module, the pressure exerted on the driver-side protective cover or dashboard causes selected portions of the cosmetic cover to separate, in a predetermined manner, along tear seams or breakaway seams (hereinafter referred to as "tear seams") to enable the air bag to be directed into the passenger compartment.

In one of the conventional methods for mounting a passenger-side air bag cushion to a two-part canister, the base of the air bag cushion is wrapped over the bottom edge of the first or top canister section. The top canister section is inserted into the base section, thereby containing the air bag cushion between the two canister sections, and a diffuser is installed in the interior of the canister. The canister sections, air bag cushion, and diffuser are joined together by rivets.

In the event of a collision, the large forces produced by the inflation of the bag and the impact of the body of the occupant against the bag tend to pull the clamped portion of the bag from the canister mounting. The force holding the air bag to the upper retainer of the canister is not evenly distributed over the entire area of the abutment between the upper retainer section and the lower retainer section. Instead, the force of holding the air bag to the upper retainer of the canister is concentrated in the shearing resistance of that part of an air bag which has a width corresponding to the diameter of the fastener and a length corresponding to the distance from the fastener to the edge of the gas inlet opening of the air bag. This clamping action of the retainer section may be insufficient to prevent separation of the bag from the retainers. Such separation may permit the escape of gas directly into the passenger compartment of the vehicle. Further, the edge of the canister top section over which the air bag cushion is wrapped may act like a cutting blade during the deployment of the air bag cushion, thereby cutting the base of the air bag cushion. This may release the air bag cushion from the canister allowing gas to escape into the passenger compartment, thus the gas in not useable for the deployment of the air bag cushion.

SUMMARY OF THE INVENTION

The objective of this invention is to overcome one or more of the deficiencies noted in the prior art. This and other objectives of the invention, which will become apparent from the following description, have been achieved by a novel air bag attachment device comprising an air bag retention clip having a substantially planar section, an inwardly curved base section, and a number of apertures formed in the planar section. The section of the air bag cushion adjacent to the gas inlet opening is attached to the air bag retention clip by stitches or adhesive means. The base of the canister top section is then inserted into the retention clip so that the curved section of the clip engages with the bottom edge of the canister. The air bag cushion is then passed around the end of the clip and over the opposite side of the canister first section. The canister is assembled and a diffuser is inserted. The canister sections, with the clip and air bag cushion contained there between, and the diffuser are secured together using fasteners or the like.

BRIEF DESCRIPTION OF THE DRAWINGS

With this description of the invention, a detailed description follows with reference being made to the accompanying figures of drawings which form part of the specification related thereto, in which like parts are designated by the same reference numbers, and of which.

DETAILED DESCRIPTION OF THE INVENTION

Description of the Preferred Embodiment

Figure 1:
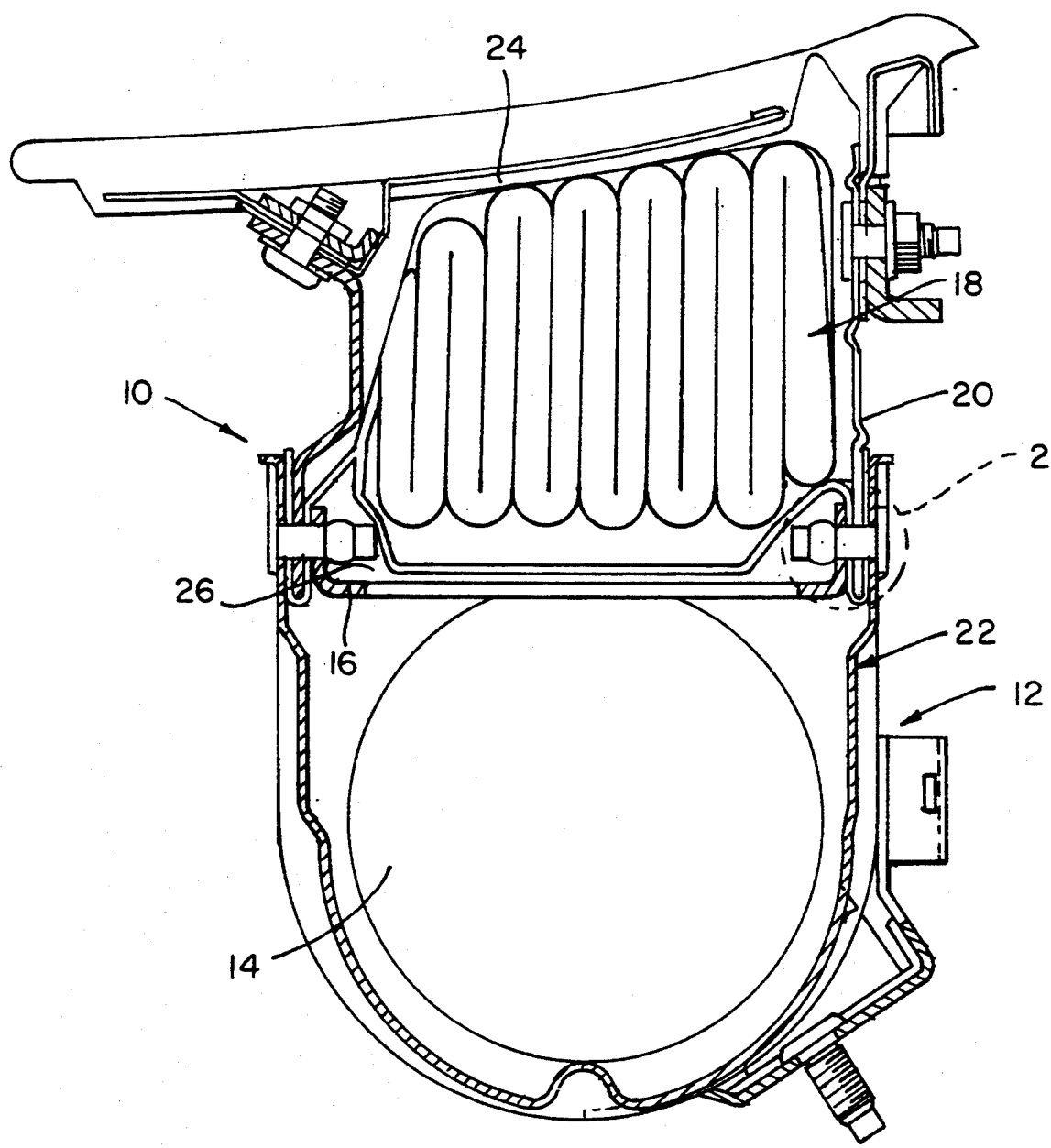
FIG. 1 is a cross-sectional view illustrating a canister and air bag cushion assembly using the retention clip of this invention.

Referring to FIG. 1, a passenger-side inflator module containing the retention clip of this invention is shown generally at 10. The passenger-side module comprises a canister 12 containing an inflator 14 and capped by a diffuser 16, and an air bag cushion 18 attached to the canister 12. The canister 12 is of a two-part design with a top section 20 and a base section 22.

Figure 2:
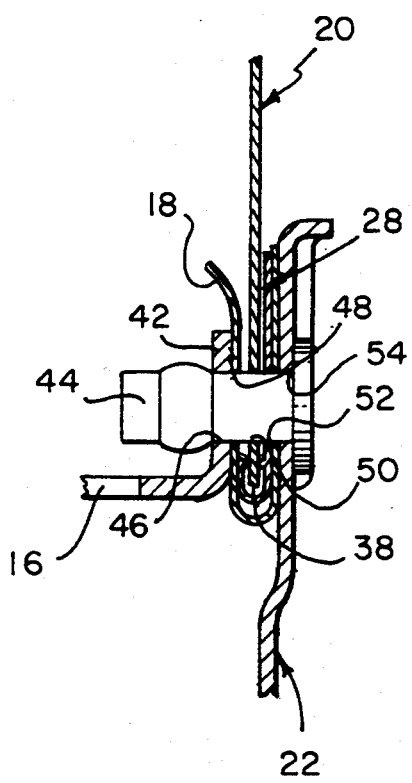
FIG. 2 is an enlarged fragmented side-plan view of section 2 of FIG. 1 illustrating the retention clip of the invention.
Figure 3:
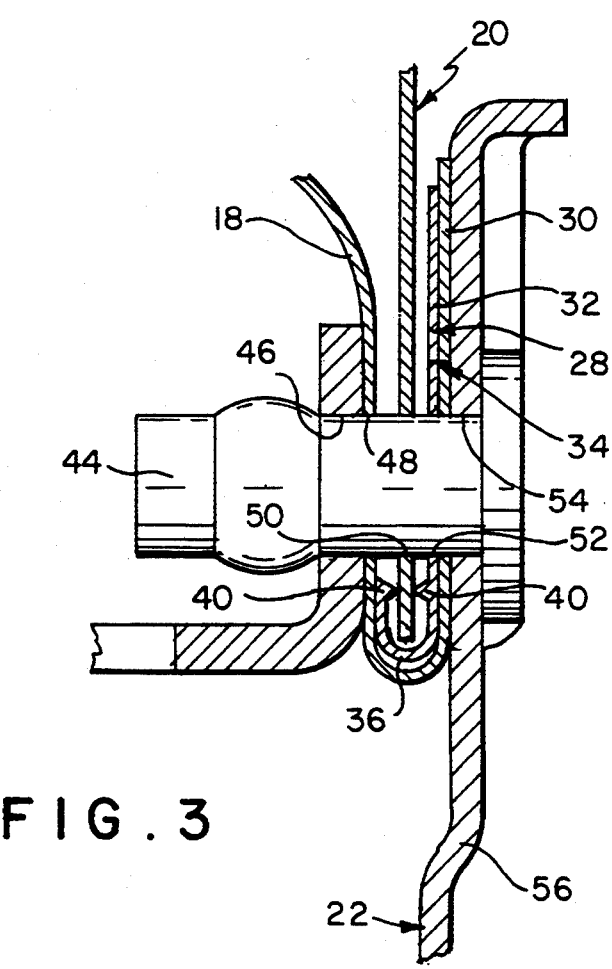
FIG. 3 is a further enlarged fragmented side-plan view of section 2 of FIG. 1.

The air bag cushion 18, comprises a first section or cushion section 24 and a gas inlet 26. The air bag cushion 18 is attached to the canister 12 with a retention clip 28 of this invention, as shown in FIGS. 2 and 3. The portion of the air bag cushion 18 adjacent to the edge 30 is attached to the planar section 32 of the retention clip 28 by stitches 34 or adhesives. The curved base section 36 of the retention clip 28 is inserted over the bottom edge 38 of the canister top section 20 and is engaged by grips 40. The air bag cushion 18 adjacent to the gas inlet 26 is passed over the curved base section 36. A diffuser 16 with a flange 42 having rivets 44 inserted through first apertures 46 therein, second apertures 48 in the air bag cushion 18, third apertures 50 in the bottom edge 38 of the canister top section 20, and fourth apertures 52 in the retention clip 28. This subassembly is installed into the canister base section 22 by passing rivets 44 through fifth apertures 54 in the base section 22 and securing the rivets 44. The retention clip 28 runs substantially the length of the canister side walls 56.

The retention clip 28 can be formed from any suitable material such as metal or a polymeric material. Semi-rigid polymeric materials, such as, but not limited to, polyethylene, polypropylene, or polyamides such as nylon 6, or nylon 6, 6, are preferred. The retention clip 28 can be formed by standard extrusion processes or injection molding processes.

The retention clip 28 is designed to work with a two-part canister described hereinabove. The retention clip 28 can be used with standard air bag cushions 18 and inflators 14 known in the art. A suitable inflator is discussed in Adams et al., U.S. Pat. No. 4,296,084, which invention is assigned to the assignee of the present invention, and which is incorporated herein by reference.

The passenger inflator module 10 is installed in a motor vehicle by means known in the art. Appropriate electrical connections are made to attach the inflator 14 to sensors and the appropriate ignition system. A signal from a crash sensor triggers the inflator 14 to provide gas in order to deploy the air bag cushion 18, as shown in FIG. 1, to protect a vehicle occupant. As the air bag cushion 18, deploys the forces of deployment are distributed over the length of the retention clip 28 by the stitches or adhesive joining the air bag cushion 18 to the retention clip 28. Further, the force exerted by the bottom edge 38 of the canister top section 20 on the deploying air bag cushion 18 is distributed over the curved base section 36, thereby significantly reducing the possibility of the air bag cushion 18 being cut.

Thus, in accordance with the invention, there has been provided a device which distributes the deployment forces along the mouth of the cushion. There has also been provided a device which protects that portion of the air bag cushion adjacent to the bottom edge of the canister top section, thereby reducing the possibility that the air bag cushion will be cut by the bottom edge.

While the above description constitutes the preferred embodiment of the present invention, it will be appreciated that the invention is susceptible to modification, and change without departing from the proper scope and fair meaning of the accompanying claims.

I claim:

1. A device for securing an air bag cushion to a module housing comprising:
    a canister having a substantially planar first section and a second section, said first section having a top edge, a bottom edge, a first surface and a second surface and a plurality of first apertures formed therein, said second section having a top edge and a substantially planar section adjacent said top edge, and a plurality of second apertures therein;
    a diffuser comprising an attachment means and a plurality of third apertures formed therein; and
    an air bag retention clip having a substantially planar section and an inwardly curved base section, said air bag retention clip having a plurality of fourth apertures formed therein;
    said air bag cushion comprising a body that terminates at a gas inlet opening for said air bag cushion and a plurality of fifth apertures formed in said air bag cushion adjacent said gas inlet opening;
    wherein said retention clip is attached to said air bag cushion adjacent to said gas inlet opening and said canister first section bottom edge is inserted into said retention clip such that said curved base section engages with said bottom edge and said planar section of said air bag retention clip is adjacent to one surface of said canister first section, wherein said air bag cushion is passed outwardly of said curved base section and back over the other surface of said canister first section, and fastener means are inserted through one of each of said second apertures, said fifth apertures, said fourth apertures, said first apertures and said third apertures thereby securing said air bag cushion onto said retention clip.

2. The device of claim 1 wherein said air bag retention clip is stitched to said air bag cushion.

3. The device of claim 1 wherein said air bag retention clip is made from a polymeric material.

* * * * *